(12) United States Patent
Truong et al.

(10) Patent No.: US 9,212,815 B2
(45) Date of Patent: Dec. 15, 2015

(54) COMPUTER DISPLAY WITH BOTTOM ILLUMINATION TO ILLUMINATE KEY-BASED INPUT DEVICE

(71) Applicant: Lenovo (Singapore) Pte. Ltd., New Tech Park (SG)

(72) Inventors: Cuong Huy Truong, Cary, NC (US); John David Swansey, Durham, NC (US); David Wayne Hill, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 139 days.

(21) Appl. No.: 14/099,264

(22) Filed: Dec. 6, 2013

(65) Prior Publication Data

US 2015/0159859 A1    Jun. 11, 2015

(51) Int. Cl.
*F21V 33/00* (2006.01)
*G06F 1/16* (2006.01)
*F21Y 101/02* (2006.01)

(52) U.S. Cl.
CPC .......... *F21V 33/0052* (2013.01); *G06F 1/1637* (2013.01); *F21Y 2101/02* (2013.01)

(58) Field of Classification Search
CPC . G06F 1/1601; G06F 1/1637; F21V 33/0052; F21Y 2101/02
See application file for complete search history.

(56) References Cited

U.S. PATENT DOCUMENTS

| 6,771,333 B2 * | 8/2004 | Tanaka et al. ................... 349/65 |
| 2007/0165406 A1 * | 7/2007 | Wang ............................. 362/253 |

OTHER PUBLICATIONS

Cuong Huy Truong, David Wayne Hill, John David Swansey, "Display Device with Chain for Actuating Light Source on the Display Device" complete filing package of related U.S. Appl. No. 14/539,560, filed Nov. 12, 2014.
IDEACENTRE A700—Product information from website, http://http://shop.lenovo.com/us/en/desktops/ideacentre/a-series/a700/ printed from website Nov. 13, 2013.

* cited by examiner

*Primary Examiner* — Mary Ellen Bowman
(74) *Attorney, Agent, or Firm* — John L. Rogitz; John M. Rogitz

(57) ABSTRACT

A computer display includes a row of lamps such as LEDs arranged along the bottom edge of the display to project light forwardly and downwardly from the display to the typical location at which a keyboard is positioned to provide balanced, non-glaring illumination of the keyboard.

20 Claims, 3 Drawing Sheets

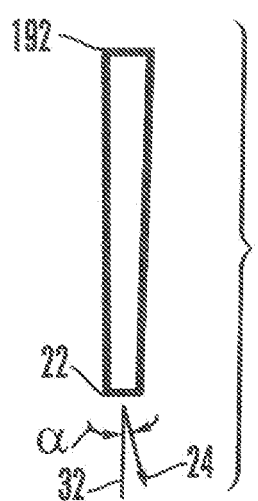
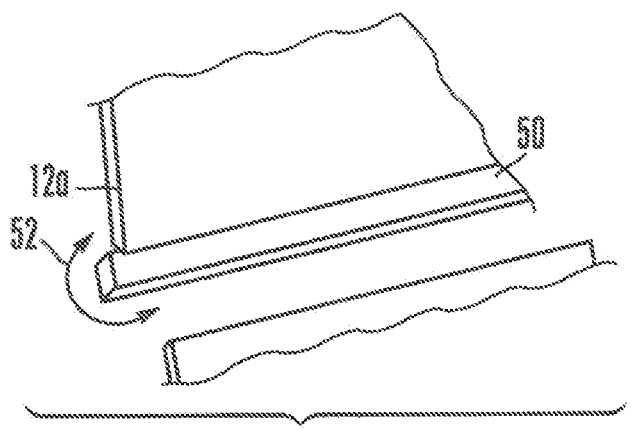
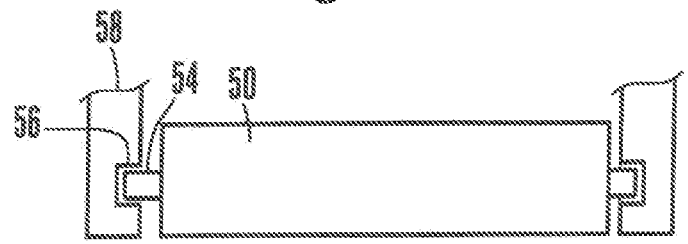
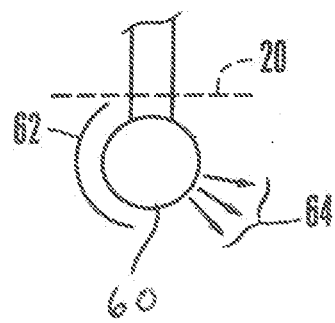

COMPUTER DISPLAY WITH BOTTOM ILLUMINATION TO ILLUMINATE KEY-BASED INPUT DEVICE

FIELD

The present application relates to computer displays with bottom edge illumination to illuminate a key-based input device such as a keyboard that typically is positioned below and in front of the display.

BACKGROUND

Computer users often prefer low ambient lighting in general but require light to illuminate keyboards, touchpads, or other key-based input devices and/or peripheral devices, so that they can see details of the peripheral devices such as the keys in darkened locations. As understood herein, individual lamps may be placed e.g. on the keyboard under each key but this undesirably requires a large number of lamps, constitutes a drain on the battery of a wireless keyboard, and produces uneven lighting and/or glare shining directly up through each individual key and around the keys, producing distracting bright spots.

SUMMARY

Accordingly, an apparatus includes a frame defining a bottom edge and a video display portion coupled to the frame which presents demanded images under control of a computer processor. A row of lamps is arranged along the bottom edge of the frame.

In example embodiments, the lamps include light emitted diodes (LEDs). Or, the lamps may include liquid crystals. In example, the lamps project light downwardly from the bottom edge. In specific examples, the display defines a top and a top-to-bottom dimension is established between the top and the bottom edge, with the lamps projecting light downwardly at an oblique angle with respect to the top-to-bottom dimension.

In one implementation, at least one lamp projects a spreading beam of light centered on a projection axis, and the projection axis is oriented at the oblique angle with respect to the top-to-bottom dimension. In another implementation, at least one lamp projects a spreading beam of light centered on a projection axis, and the projection axis is oriented in the top-to-bottom dimension. In this example implementation the display may include a light redirecting member receiving light propagating along the projection axis and redirecting the light along a redirection axis that is oblique to the projection axis. A translucent diffuser element may be juxtaposed with the bottom edge to diffuse light from the lamps prior to the light impinging on the input device.

In another aspect, a method includes establishing a lamp assembly along a bottom portion of an apparatus including a video display member, and arranging the lamp assembly to direct light in a direction defining an axis that is oriented downwardly and frontally outwardly from the display.

In another aspect, an apparatus includes a display assembly which presents demanded images visible from a front of the display. The display assembly defines a bottom portion. At least one illuminator is energizable to generate a light beam. The display directs the light beam downwardly from the bottom portion toward the front of the display.

The details of present principles, both as to their structure and operation, can best be understood in reference to the accompanying drawings, in which like reference numerals refer to like parts, and in which:

BRIEF DESCRIPTION OF THE DRAWINGS

FIG. 4 is a side elevational view of the display schematically illustrating the angle at which the LEDs in FIG. 3 direct light;

FIG. 5 is a perspective view with portions cut away, illustrating an alternate embodiment in which the LEDs are positioned above a diffuser or a reflector plate, which may be tiltably engaged with the display;

FIG. 6 is a schematic front elevational view of the plate shown in FIG. 5, with portions of the frame broken away for clarity; and FIG. 7 is a side elevational view of an example light in a row of lights on the display with a reflector or refractor directing light at an angle in accordance with present principles.

DETAILED DESCRIPTION

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
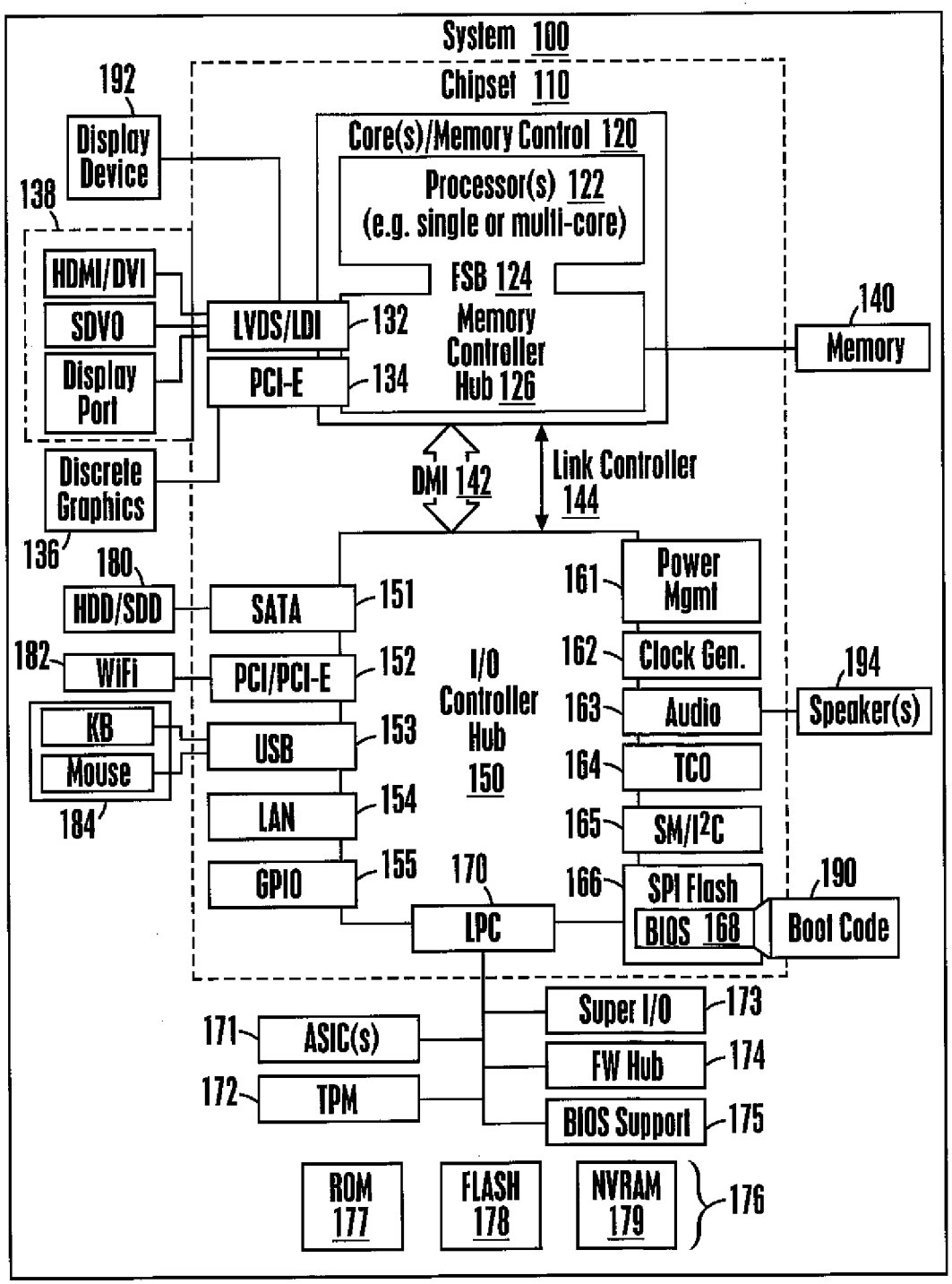
FIG. 1 is a block diagram of an example computing device in accordance with present principles.

While various exemplary circuits or circuitry are discussed, FIG. 1 depicts a block diagram of an illustrative exemplary computer system 100. The system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory".

The memory controller hub 126 further includes a low-voltage differential signaling interface (LVDS) 132. The LVDS 132 may be a so-called LVDS Display Interface (LDI) for support of a video display apparatus 192 (including, e.g., a CRT, a flat panel, a projector, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card. An exemplary system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface), a general purpose I/O interface (GPIO) 155, a low-pin count (LPC) interface 170, a power management interface 161, a clock generator interface 162, an audio interface 163 (e.g., for speakers 194), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168. Again, as described herein, an exemplary client device or other machine may include fewer or more features than shown in the system 100 of FIG. 1.

Figure 2:
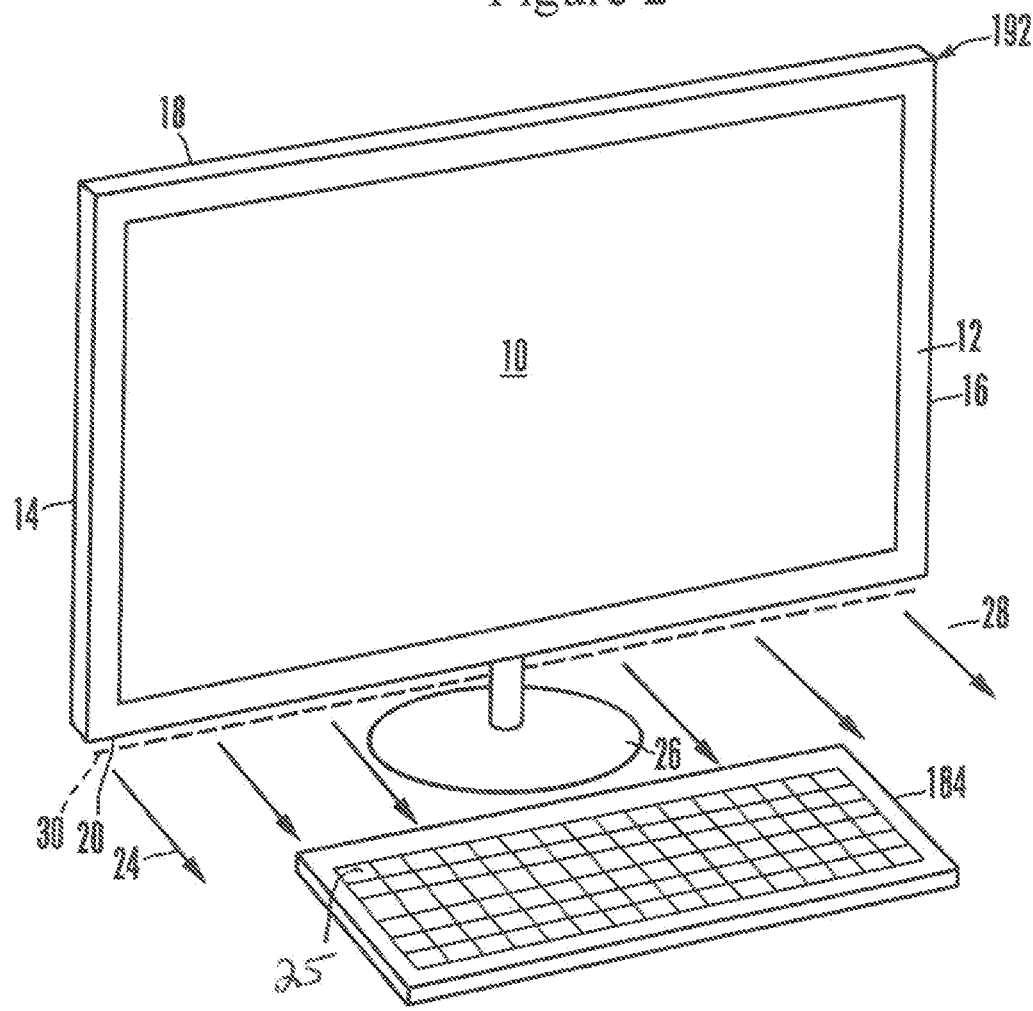
FIG. 2 is a perspective view of a display looking at the front of the display with bottom lamps to illuminate a key-based input device, schematically showing light from lamps on the bottom edge of the display illuminating the input device.

FIG. 2 shows that the display apparatus 192 can include a video display member 10 that is configured for presenting demanded images. The demanded images are presented on the front of the display, which is the side of the display member shown. A frame (which may be referred to as a bezel) 12 can bound all or part of the typically rectilinear periphery of the display member 10. Accordingly, the frame 12 can have left, right, top, and bottom sides defining respective left, right, top, and bottom edges 14, 16, 18, as shown. In some embodiments the display member 10 can overlap the frame 12, so that while the frame 12 remains present it may not be visible from the front of the apparatus looking at the display member 10.

Figure 3:
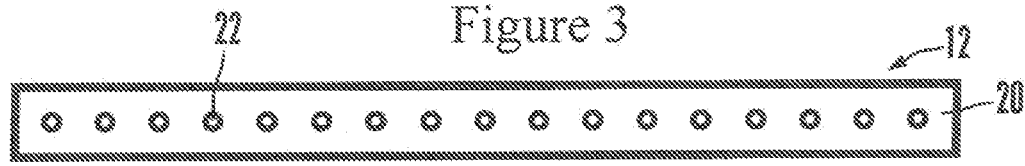
FIG. 3 is a bottom plan view of the display, showing a row of light emitting diodes (LEDs) arranged along the bottom edge of the display.

In cross-reference to FIGS. 2-4, at least one and preferably a row of illuminators 22 (FIG. 3) such as lamps, e.g., light emitting diodes (LEDs), liquid crystals, and combinations thereof, are juxtaposed with the bottom edge 20 of the frame 12. In the example shown in FIG. 3 the illuminators 22 are mounted on the bottom-facing horizontal edge of the frame 12. In other examples the illuminators may be mounted on the bottom portion of the frame but above the horizontal bottom edge, e.g., the illuminators may be mounted on the front-facing or rear-facing vertical sides of the bottom portion of the frame.

As shown best in FIGS. 2 and 4, the illuminators emit light beams 24 that are directed by the apparatus downwardly and in front of the display to illuminate the top surface of objects in front of the display such as the key-based input device 184 that typically are disposed on the same surface as the display. Even further, in some embodiments the input device 184 may have one or more reflecting elements 25 (which may in other embodiments be refracting elements) configured for reflecting light at least from the illuminators 22. For example, in embodiments where the input device 184 is a keyboard, each key on the keyboard may include at least one reflecting element 25, and furthermore the reflecting elements 25 may even be e.g. configured on each respective key to represent the character associated with the respective key such that e.g. a letter "A" is formed by a reflecting element 25 on a top surface of the key for the letter "A." In addition to or in lieu of the foregoing, a reflecting element 25 may be positioned along at least one and even all four top edges of each of the keys to thereby provide at least a partial key outline for each key. As another example, in embodiments where the input device 184 is a mouse, a reflecting element 25 may at least partially circumscribe an outer periphery of a scroll wheel of the mouse.

In either case, it is to be understood that the reflecting elements 25 may be configured from any suitable reflecting material, and even e.g. may include materials for reflecting black light such as black light reflective paint and/or material, ultraviolet reactive paint and/or material, neon paint and/or material, glow in the dark paint and/or material, so called "tattoo ink" and/or "tattoo material" that is e.g. invisible to the human eye absent black light but appears (e.g. glows) under black lighting. Accordingly, present principles recognize that in some embodiments the illuminators 22 may emit UV light such as black light.

Still in cross-reference to FIGS. 2-4, in the embodiment of FIG. 2 the display apparatus 192 is mounted on a base 26 that is disposed on a flat horizontal surface 28, as is the input device 184. A dashed line 30 indicates the portion of the surface 30 that is directly below the bottom edge 20 of the frame 12, with substantially all light from the illuminators 22 being directed downwardly forward of the line 30.

In other words, as best illustrated in FIG. 4, a top-to-bottom dimension 32 is established from the top to the bottom of the display apparatus, and the light from the illuminators 22 is directed forward and down at an oblique angle α with respect to the top-to-bottom dimension 32, which may be a vertical or -near-vertical dimension. In one embodiment, each illuminator emits light that spreads outwardly as it propagates, centered along a projection axis, and the illuminators 22 are oriented to point downwardly and outwardly toward the front of the display as shown such that the projection axis itself forms the angle α with the top-to-bottom dimension.

In another embodiment, the illuminators themselves may be oriented to project light straight down (and/or e.g. downwardly along a vertical axis) from the bottom edge 22 of the frame 12, with a reflector or refractor interposed to redirect light along a redirection axis that forms the oblique angle α with the top-to-bottom dimension. For example, a display frame 12a is shown in FIG. 5, and an opaque reflecting plate (equivalently, a transparent or translucent refracting plate) 50 is coupled to the frame 12a to reflect (or refract) light along the redirection axis. Or, the plate 50 may be made of a translucent diffusing material that diffuses light that passes through it. In any case, the plate 50 may be pivotally coupled to the bottom portion of the frame 12a for tilting motion as indicated by the arrows 52. In an example shown in FIG. 6, small cylindrical axles 54 may protrude from the left and right edges, respectively, of the plate 50 and may engage respective holes or openings 56 formed in respective left and right bottom extensions 58 of the frame 12a in a close interference fit, so that a person can tilt the plate 50 by hand to redirect light at a desired angle onto the input device in front of the display.

Now in reference to FIG. 7, it shows is a side elevational view of an example light emitting diode (LED) 60 in a row of lights on (e.g. a bottom portion of) a display in accordance with present principles, with a reflector or refractor 62 directing light at plural angles from e.g. an angle at least substantially parallel to a top-to-bottom (e.g. vertical) display angle to e.g. an oblique angle as set forth herein. Note that the reflector or refractor 62 may be e.g. coupled to a portion of the frame 12 such as the bottom edge 20, and/or may be coupled to a portion of the LED 60 itself. In embodiments where the reflector or refractor 62 is a reflector, the reflector may be a mirror. In embodiments where the reflector or refractor 62 is a refractor, the refractor may be a light diffuser. In any case, it may be appreciated from FIG. 7 that light beams 64 are emanating at plural angles downwardly and outwardly (e.g. frontally relative to a display member of the display) of the from the LED 60/reflector or refractor 62 assembly.

Without reference to any particular figure, it is to be understood that movement of e.g. a reflecting plate such as the plate 50 described above and/or the LED 60/reflector or refractor 62 assembly also described above may be automated such that e.g. such elements may dynamically move based on the location of a peripheral device to direct light toward to peripheral device. For instance, assume that a processor on the peripheral device transmits its location (e.g. GPS coordinates as determined using a GPS transceiver on the peripheral device) using a peripheral device transceiver to a processor on the display 12 through a display transceiver. The processor on the display 12 may thus use the GPS coordinates of the peripheral device to determine the location of the peripheral device relative to the display 12 (e.g. using a GPS transceiver on the display 12) to adjust (e.g. automatically without user input) a reflecting plate, reflecting assembly, etc. thereon to direct light toward the peripheral device at its (e.g. indicated) location.

While the particular COMPUTER DISPLAY WITH BOTTOM ILLUMINATION TO ILLUMINATE KEY-BASED INPUT DEVICE is herein shown and described in detail, it is to be understood that the subject matter which is encompassed by the present application is limited only by the claims.

What is claimed is:

1. Apparatus comprising:
    a frame defining a bottom edge facing downward;
    a video display portion coupled to the frame and which presents demanded images under control of a computer processor; and
    a row of lamps arranged on a support member pivotably coupled to the frame, the support member being movable under control of a processor.

2. The apparatus of claim 1, wherein the lamps include light emitted diodes (LEDs).

3. The apparatus of claim 1, wherein the lamps include liquid crystals.

4. The apparatus of claim 1, wherein the lamps project light downwardly from the bottom edge.

5. The apparatus of claim 1, wherein the display defines a top and a top-to-bottom dimension is established between the top and the bottom edge, the lamps projecting light that is directed by the apparatus downwardly at an oblique angle with respect to the top-to-bottom dimension.

6. The apparatus of claim 5, wherein at least one lamp projects a spreading beam of light centered on a projection axis, and the projection axis is oriented at the oblique angle with respect to the top-to-bottom dimension.

7. The apparatus of claim 5, wherein at least one lamp projects a spreading beam of light centered on a projection axis, and the projection axis is oriented in the top-to-bottom dimension, and the display further comprises:
    a light redirecting member receiving light propagating along the projection axis and redirecting the light along a redirection axis that is oblique to the projection axis.

8. The apparatus of claim 1, further comprising a translucent diffuser element juxtaposed with the bottom edge to diffuse light from the lamps prior to the light impinging on the input device.

9. Method comprising:
    establishing a lamp assembly along a display apparatus including a video display member;
    arranging the lamp assembly to direct light in a direction defining an axis that is oriented downwardly and frontally outwardly from the display; and
    automatically moving a plate associated with the lamp assembly under control of a processor.

10. The method of claim 9, wherein the lamp assembly comprises light emitting diodes.

11. The method of claim 9, wherein the lamp assembly comprises liquid crystals.

12. The method of claim 9, wherein the lamp assembly includes plural lamps on a bottom edge of a frame of the display apparatus, the frame bounding the video display member.

13. The method of claim 9, comprising providing a translucent diffuser element juxtaposed the bottom portion of the display apparatus.

14. Apparatus comprising:
- display assembly which presents demanded images visible from a front of the display, the display assembly defining a bottom portion;
- at least one illuminator energizable to generate a light beam, wherein the display apparatus directs the light beam toward the front of the display; and
- a light redirecting member positioned below the illuminator and pivotably coupled to the bottom portion of the display assembly to redirect light from the illuminator.

15. The apparatus of claim 14, wherein the display assembly comprises a video display member which outputs the demanded images, and a frame at least partially bounding the video display member, the illuminator being mounted on a bottom edge of the frame.

16. The apparatus of claim 15, comprising a row of illuminators mounted on the bottom edge of the frame.

17. The apparatus of claim 14, wherein the illuminator is a light emitting diode.

18. The apparatus of claim 14, wherein the light redirecting member is movable under control of a processor.

19. The apparatus of claim 14, comrising a diffuser element positioned on the apparatus to diffuse light from the illuminator.

20. The apparatus of claim 19, wherein the display assembly comprises a video display member which outputs the demanded images, and a frame at least partially bounding the video display member, the diffuser being pivotably mounted on the frame.

\* \* \* \* \*